United States Patent
Wilson et al.

(10) Patent No.: US 11,683,391 B2
(45) Date of Patent: Jun. 20, 2023

(54) PREDICTING MICROSERVICES REQUIRED FOR INCOMING REQUESTS

(71) Applicant: International Business Machines Corporation, Armonk, NY (US)

(72) Inventors: Matthew Paul Wilson, Easteligh (GB); David Richard Jones, Eastleigh (GB); Sandra Hayward, Eastleigh (GB); Johanna Saladas Zaaijer, Winchester (GB); Christopher Neil Bailey, Romsey (GB); Ian Partridge, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 116 days.

(21) Appl. No.: 17/471,240

(22) Filed: Sep. 10, 2021

(65) Prior Publication Data
US 2023/0088581 A1 Mar. 23, 2023

(51) Int. Cl.
| | | |
|---|---|---|
| H04L 67/566 | (2022.01) | |
| H04L 41/14 | (2022.01) | |
| G06N 20/00 | (2019.01) | |
| H04L 67/63 | (2022.01) | |

(52) U.S. Cl.
CPC .......... *H04L 67/566* (2022.05); *G06N 20/00* (2019.01); *H04L 41/14* (2013.01); *H04L 67/63* (2022.05)

(58) Field of Classification Search
None
See application file for complete search history.

(56) References Cited

U.S. PATENT DOCUMENTS

| | | | |
|---|---|---|---|
| 10,547,522 B2 | 1/2020 | Hutchison et al. | |
| 10,547,682 B2 | 1/2020 | Suter et al. | |
| 11,561,706 B2* | 1/2023 | Mulholland | .......... G06F 3/0631 |
| 2020/0081745 A1 | 3/2020 | Cybulski et al. | |
| 2022/0108147 A1* | 4/2022 | Wan | ......... H04L 67/51 |
| 2022/0164186 A1* | 5/2022 | Pamidala | .............. G06F 9/5088 |

FOREIGN PATENT DOCUMENTS

| | | | | |
|---|---|---|---|---|
| CN | 111475235 A | 7/2020 | | |
| EP | E P-3321865 A1 * | 5/2018 | ....... | G06F 16/90335 |

OTHER PUBLICATIONS

Lin, "Mitigating Cold Starts in Serverless Platforms," arXiv:1903.12221v1 [cs.DC], Mar. 28, 2019, 5 pages, https://arxiv.org/pdf/1903.12221.pdf.

(Continued)

*Primary Examiner* — Jeffrey R Swearingen
(74) *Attorney, Agent, or Firm* — Rachel M. Yadlosky

(57) ABSTRACT

A method, system, and computer program product for predicting microservices required for incoming requests for reducing the start latency of serverless microservices. The method may include obtaining tracing data of microservices of an application for historical requests processed by the application. The method may also include grouping the tracing data based on common request attributes. The method may also include aggregating each group into rules relating the common request attributes to lists of microservices. The method may also include building a predictive model formed of the rules for processing incoming requests to obtain a list of predicted microservices required for the incoming request based on attributes of the incoming request.

20 Claims, 9 Drawing Sheets

(56) References Cited

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pages.

Rehemagi, "Can We Solve Serverless Cold Starts," dashbird, Jul. 24, 2021, 11 pages, https://dashbird.io/blog/can-we-solve-serverless-cold-starts/.

Melissa, "Why You Should Use a Predictive Autoscaler with the Kubernetes HPA," opsani, Gartner, Apr. 16, 2020, 5 pages, https://opsani.com/blog/predictive-autoscaler-balancer-with-the-kubernetes-hpa/.

Jones et al., "Reducing Start Latency of Serverless Microservices," U.S. Appl. No. 17/172,407, filed Feb. 10, 2021.

\* cited by examiner

PREDICTING MICROSERVICES REQUIRED FOR INCOMING REQUESTS

BACKGROUND

The present invention relates to microservice computing systems, and more specifically, to predicting microservices required for incoming requests for reducing the start latency of serverless microservices.

SUMMARY

The present invention provides a computer-implemented method, system, and computer program product for predicting microservices required for incoming requests for reducing the start latency of serverless microservices. The method may include obtaining tracing data of microservices of an application for historical requests processed by the application. The method may also include grouping the tracing data based on common request attributes. The method may also include aggregating each group into rules relating the common request attributes to lists of microservices. The method may also include building a predictive model formed of the rules for processing incoming requests to obtain a list of predicted microservices required for the incoming request based on attributes of the incoming request. The system and computer program product may include similar steps.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
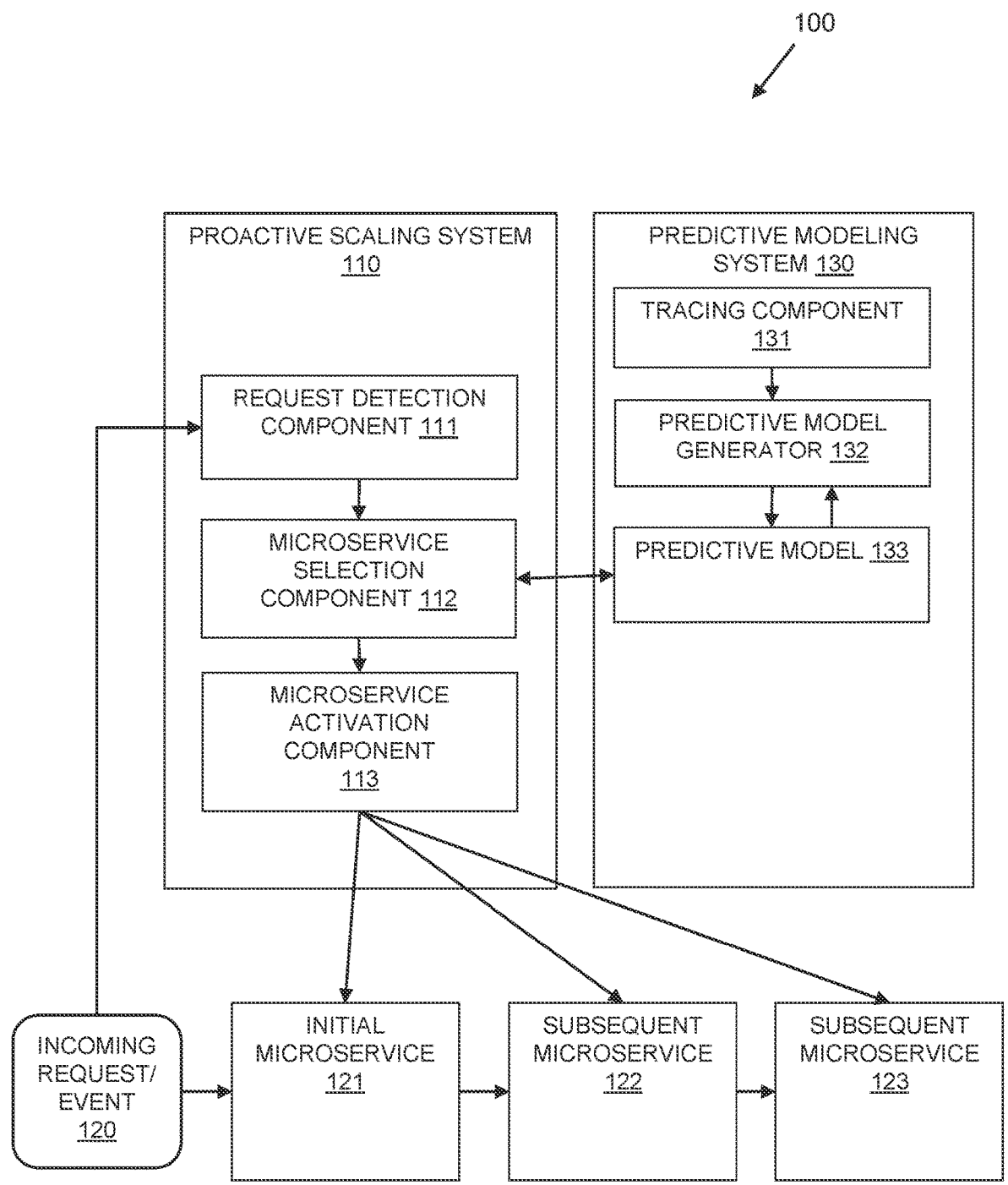
FIG. 1 depicts a block diagram of an example embodiment of a system in accordance with the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is common practice to decompose complex applications into many independent parts (referred to as "microservices") that cooperate via messaging, and the combined set of microservices represents a complete application.

Containers are used for deploying microservices of applications in the cloud. Containers offer significant advantages over previous technologies like Virtual Machines as they are more portable, quicker to start and stop, and integrate better with continuous integration and continuous delivery (CI/CD) systems. Multiple containers can be run or "orchestrated" together, where each container runs a separate microservice and the combined set of microservices represents a complete application. For example, there are open-source container orchestration systems for automating application deployment, scaling, and management.

Cloud environments typically bill users according the resources consumed and, despite containers being less resource hungry, the cost of such "compute" capacity can still spiral if left unchecked. Accordingly, it is desirable not to run containers unnecessarily, as an idle container still consumes resources and hence costs money.

The practice of running containers on demand, and in particular "scaling to zero" when idle, has become known as "serverless." A variety of open source projects offer serverless technologies which, for example, provide "scale to zero" for workloads running on the container orchestration system. Scaling to zero involves allowing a scaling service to terminate all instances of a service when there are no requests for the service to process. It is accompanied by a corresponding ability to scale the service up to one or more instances once such a request arrives.

The advantage of serverless is evident as containers are only scaled up and resources only consumed when there is work in the system. However, serverless comes with a cost as it takes time to start a container and the application within it. The time taken between a request coming in and the serverless application being available can be significant and this has become known as the "cold-start" problem.

This problem is exacerbated in a system of microservices where a single incoming request may require the invocation of multiple microservices before the response can be returned to the user. If each microservice in the system is serverless and has to scale from zero, the cumulative cold-start time of each microservice may cause large response latencies. In the worst case, the latency would be the sum of the cold-start time of each microservice. Hence, there is a need to minimize cold-start latency for serverless microservices.

A system and a method are provided for predicting microservices for incoming requests to reduce start latency of serverless microservices. Cold-start time is reduced by proactively scaling microservices based on the detection of an incoming request to an application and a prediction of the microservices that are required based on a statistical model of historical requests. This provides a dynamic startup scaling of serverless microservices using a speculative prefetch based on a statistical model.

Incoming requests to a microservice system are typically routed via an ingress controller such as a boundary firewall, application programming interface (API) gateway, or other form of ingress controller that validates the incoming request and routes it to an initial microservice inside the orchestration system. From then on, handling of the request occurs inside the microservice system until a response is returned from the initial microservice. The term "request" is defined to include application requests in the form of Hypertext Transfer Protocol (HTTP) requests, event messages, etc. and references to incoming requests may also refer to incoming events in event-based systems.

A single incoming request may require the invocation of multiple microservices before the response can be returned to the user. Microservice based applications are not typically designed so that each microservice is invoked separately by the client. Instead, the microservices usually invoke each other as needed, forming a cooperative system. This causes a chain of microservices to be invoked from a single incoming request.

In the described method and system, after validating the incoming request, a set of required microservices in the system is proactively scaled from zero simultaneously. Beginning the cold-start proactively increases the likelihood that each microservice is ready by the time it receives a call or at least it reduces the cold-start time by ensuring that scaling is already underway when a request is received.

An advantage of the described method and system is that it can scale all the microservices involved in a single request, which allows resource savings to occur by scaling the microservice containers to zero and starting them up when it is determined that they are needed for an incoming request. The described method uses a predictive model based on statistical analysis of previous requests that does not require manual configuration or definition of static rule sets.

Referring to FIG. 1, a schematic diagram 100 illustrates an example embodiment of the described method. An incoming request 120 is directed to an application that is provided by multiple microservices. The described microservice activation method and system is broadly applicable to microservice deployments, whether they communicate by Hypertext Transfer Protocol (HTTP)/Representational State Transfer (REST) or events.

The incoming request 120 is directed to an initial microservice 121 from where it invokes subsequent microservices 122, 123 required for the fulfillment of a response to the request 120.

The described proactive scaling system 110 includes a request detection component 111 that detects an incoming request 120 to an initial microservice 121 and a microservice selection component 112 that selects a set of microservices that may be required for the fulfillment of the incoming request 120 and therefore need to be scaled up.

The selection is based on a predictive model 133 that predicts a set of the microservices of an application that are required for the incoming request. The predictive model 133 is used to selectively and proactively scale only the components of the application that are predicted to be required to process the incoming request. The predictive model 133 may be referenced using elements of the request. For example, in the case of an HTTP request, the elements may be the request payload and request metadata or, in the case of an event, the elements may be obtained by parsing the event structure or schema.

A microservice activation component 113 scales up of the selected microservices 122, 123 so that they are ready, or getting ready, to be invoked by the initial microservice 121 or an intermediate microservice for the fulfillment of the incoming request 120.

By predicting a subset of the microservices of an application, only microservices that are likely to be used in processing the specific incoming request are scaled, rather than scaling the entire application. This avoids consuming resources, and the associated costs incurred, by needlessly scaling components that will not be used in the current request. For example, an application may include a user profile, order processing, and billing components, and a user's incoming request to update their profile may not involve the order or billing components at all.

The predictive model 133 is generated and refined by a predictive modeling system 130. The predictive modeling system 130 includes a tracing component 131 for providing tracing data that may be gathered by existing tracing technologies that trace transactions between distributed microservices in microservice environments. Tracing technologies may include, for example, open source distributed tracing tools. The predictive modeling system 130 includes predictive model generator 132 for processing and analyzing the tracing data to generate dynamic heuristic-based statistics on which the predictive model 133 is based. The predictive model generator 132 may also update and refine the predictive model 133 based on evaluating feedback of predictions compared to actual requirements.

The described method and service is applicable to applications with arbitrary sequences of calls between the individual microservices and by predicting which microservices will be called, the method is more dynamic and less likely to start containers that will not be used. This will reduce unnecessary resource usage and therefore reduce cost. Cold start latency is reduced to the time taken by the startup time of the slowest microservice involved, rather than the cumulative startup time where each service scales as it is invoked.

The microservice activation method may be carried out at various possible stages of a microservices system. Some example implementation options are as follows and the various stage options may be used in various combinations.

Figure 2:
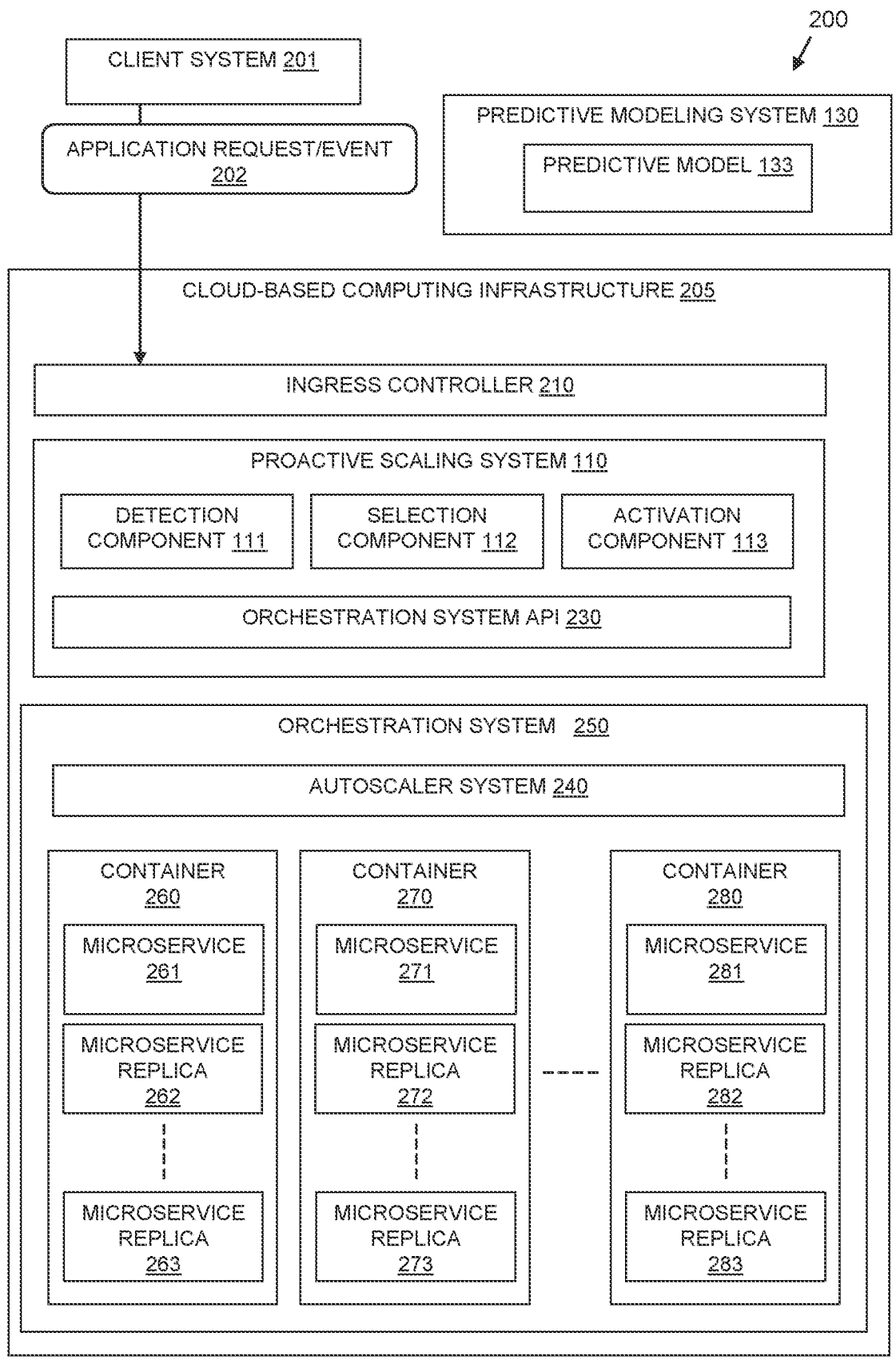
FIG. 2 depicts a block diagram of another example embodiment of a system in accordance with the present invention.

Referring to FIG. 2, a block diagram 200 shows systems which may be provided by multiple computing systems across a cloud-based computing infrastructure 205 providing a cloud-based application using microservices 261, 271, 281. The cloud-based computing infrastructure 205 may include multiple computing systems that each include at least one processor, a hardware module, or a circuit for executing the functions of components which may be software units executing on the at least one processor. Each computing system may include multiple processors running parallel processing threads may be provided enabling parallel processing of some or all of the functions of the components. Memory may be configured to provide computer instructions to the at least one processor to carry out the functionality of the components.

A client system 201 may interact with the cloud-based application by making an application request 202 and the application will typically perform work in response to the request. An ingress controller 210 may receive the request 202 and may determine the microservice 261, 271, 281 that should receive it.

An orchestration system 250 is provided for automating application deployment across microservices. Containers 260, 270, 280 are provided that are orchestrated together with each container 260, 270, 280 running a separate microservice 261, 271, 281 with a combined set of microservices providing a complete application. The microservices 261, 271, 281 can be scaled by upscaling or downscaling a number of microservice replicas 262, 263, 272, 273, 282, 283 as required to process incoming requests to an application. The orchestration system 250 may have an autoscaler system 240 that provides automatic scaling of the microservices 261, 271, 281. This may be an orchestration system integrated autoscaler system or another form of autoscaler system such as an event-driven autoscaler.

The described system includes a proactive scaling system 110 for carrying out the described microservice activation method including a detection component 111, a selection component 112, and an activation component 113. The components of the proactive scaling system 110 may be provided across various systems in the infrastructure in order to provide the described method functions to activate required microservices for an incoming application request 202. For example, the proactive scaling system 110 may include components across an ingress controller 210 and an autoscaler system 240 and may use an orchestration system API 230 for interacting with the orchestration system 250.

The described system includes a predictive modeling system 130 providing a predictive model 133 referenced by the selection component 112 of the proactive scaling system 110 as described further below.

In another form of implementation, the proactive scaling system 110 may be provided by an operator microservice in a container provided in the orchestration system 250 and may detect when an initial microservice scales from zero to one instance, and may scale the other microservices in the application in response.

The various embodiments may alert the system to the incoming traffic and proactively initiate the activation of "scale from zero" for selected microservices of the application. This allows the microservices required for the incoming traffic to begin their cold-start scaling before they actually receive any requests or events from other microservices, thereby reducing or eliminating their cold-start times.

Figure 3:
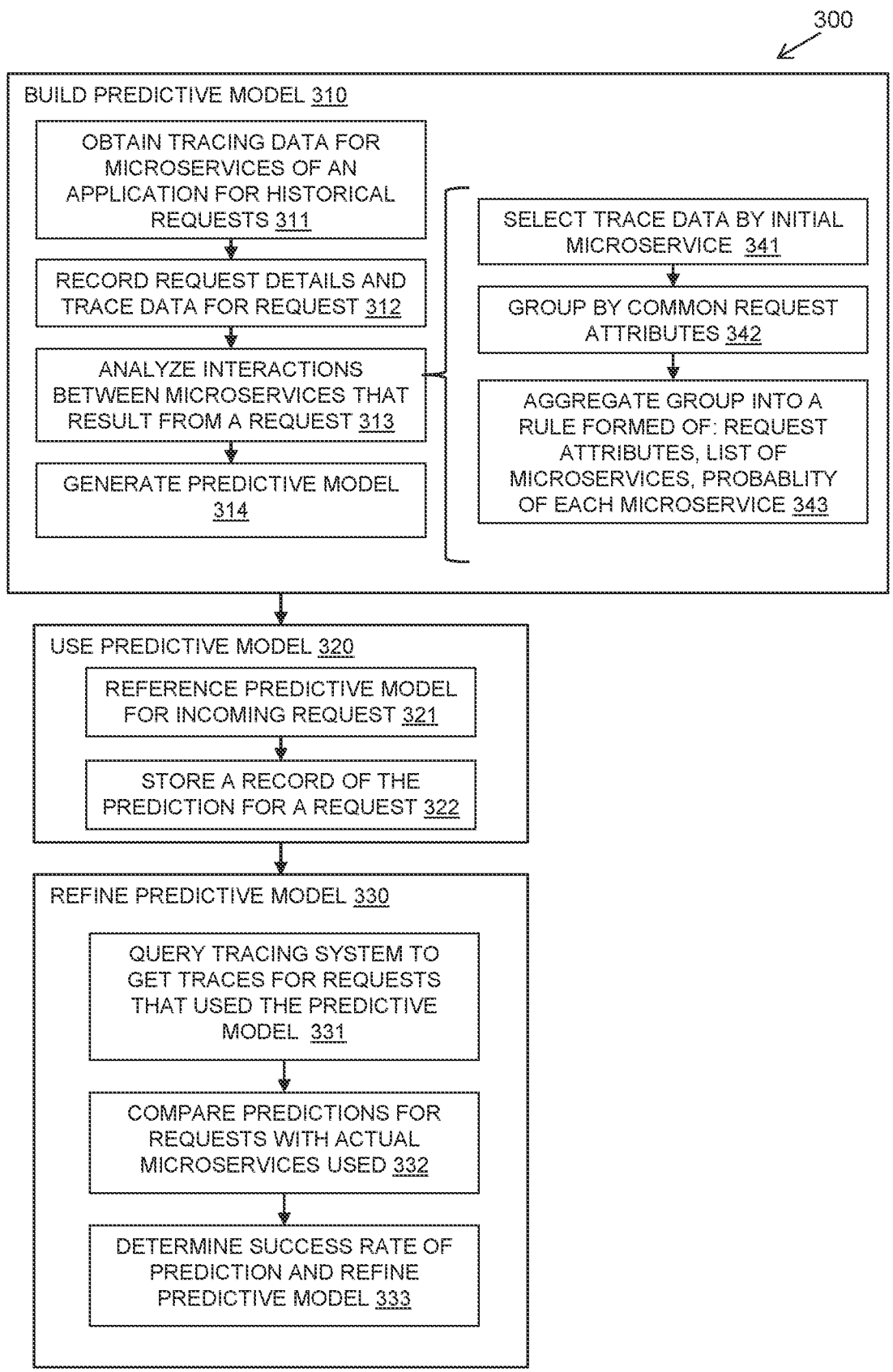
FIG. 3 depicts a flow diagram of an example embodiment of an aspect of a method in accordance with the present invention.

Referring to FIG. 3, a flow diagram 300 shows an example embodiment of aspects of the described method. There are three distinct phases to the described method. The first phase 310 builds the predictive model by collecting and processing trace data from requests processed by the application. The second phase 320 uses the predictive model during incoming user requests or events. The third phase 330 uses feedback from applying the predictive model to refine the predictive model.

The first phase 310 of building a predictive model may be carried out by a predictive modeling system 130 for providing a predictive model 133 of microservices that should be scaled up in response to an incoming request to reduce start latency for serverless microservices of an application. The method allows an application to be driven as normal until a number of requests have been traced by a tracing tool.

Known distributed tracing tools can be applied to a network of microservices, to instrument the interactions between services that result from an initial request. The resulting tracing data can be used to identify which services were involved in processing a given request. The method may obtain 311 tracing data of microservices of an application for historical requests. This may include obtaining 311 the tracing data from an already existing open tracing system that is running within the ecosystem.

The method may query the tracing system to get all traces for an initial microservice name. Details describing a request, such as its path, parameters, and/or metadata such as header, are recorded 312 with trace data that describe the paths and timings of the interactions between microservices while processing the request.

Examples of attributes of a request which may be used may include request metadata and request payload. Request metadata may include: HTTP headers (e.g. Content-Type, Content-Length, custom "x-" headers), HTTP methods (e.g. GET, POST), HTTP query parameters, HTTP request paths, and event topic names. Request payloads may include the HTTP body data or event message contents.

In the case of an event-based system, the schema will be domain specific without generic fields. A specific example of an event for an order processing system may be:

```
{
operation: "create"
orderId: 45
customerName: "Joe Bloggs"
}
```

In this case "operation" would be a metadata field determining the type of operation to be performed such as create, read, update and may determine which microservices would be involved.

The method may analyze 313 interactions between microservices that result from a request. The analysis 313 may include selecting trace data by the initial microservice 341, grouping 342 the trace data by common request attributes (such as hypertext transfer protocol (HTTP) method, path components, and parameters), and aggregating 343 each group into a rule that records the common attributes, the list of microservices, and the probability (weights) of each microservice being involved.

The analyzing may generate 314 a predictive model based on the generated rules. The predictive model describes the likelihood of invoking a particular microservice or chain of microservices given a request having certain attributes.

The second phase 320 of the method may be carried out at a proactive scaling system 110 and may reference 321 the predictive model from requests processed by the application in order to use the rules of the predictive model to obtain predicted microservices for a request. When such references are received and predictions provided, the method may store 322 a record of the predictions that the rules produce for each request to identify which microservices predicted for each request.

The third phase 330 may refine the predictive model and may query 331 the tracing system to get traces for requests that were carried out during the second phase 320 for which the predictive model was applied. The method may compare 332 the predictions for requests with the actual microservices used by the requests as recorded in the tracing system. This phase may be carried out in coordination with or at the proactive scaling system 110 as described further in relation to FIG. 4. This refinement process may alternatively be decoupled from the proactive scaling system, for example, as a batch job run periodically to assess rule accuracy and regenerate the rules as needed.

The method may determine 333 a success rate of each rule in the predictive model by comparing the prediction for each request with the recorded outcome and using the success rate to decide whether to refine the predictive model.

There are various ways in which the success rate may be used to decide whether to refine the model. Some examples are given below.

If the success rate of a particular rule falls below a given threshold, newly collected trace data may be used to update the weights for each service in the rule.

If the success rate of a particular rule could be improved by splitting it into more specific rules based on additional parameters, then the rule may be refined by splitting.

If the overall success rate of the predictive model falls below a given threshold, the model may be rebuilt by repeating the building process 310.

If evaluation determines that the model has become less successful over time, the range of trace data to use when rebuilding may include only more recent traces.

For each refinement, the overall accuracy of the predictive model may be calculated and, if the accuracy increases, the refinements are kept.

Over time, the predictive model may be incrementally refined for predicting which microservices will be involved in a future request. This provides an intelligent and dynamic approach, where the subset of microservices to scale up is determined by instrumentation of the complete application over time. This is achieved through a use of tracing data gathered by microservice tracing tools. The tracing data is processed and analyzed to generate dynamic heuristic-based statistics, which can be used by to scale up microservices dynamically.

The method uses data gathered by a tracing system to build a statistical model that predicts the set of microservices involved in fulfilling a request based on its parameters, and how that model is refined over time. Requests are made to our example system using REST over HTTP, but approach could readily be applied to other forms of communication (e.g., messaging). Equivalent metadata could be extracted from messages using a schema. The schema can be used to extract metadata fields from the message body in an event-based system and the metadata fields may replace the request path in the examples below. The algorithm determines the combinations of these pieces of metadata that make a group of traces in order to create a rule in the same way.

Figure 4:
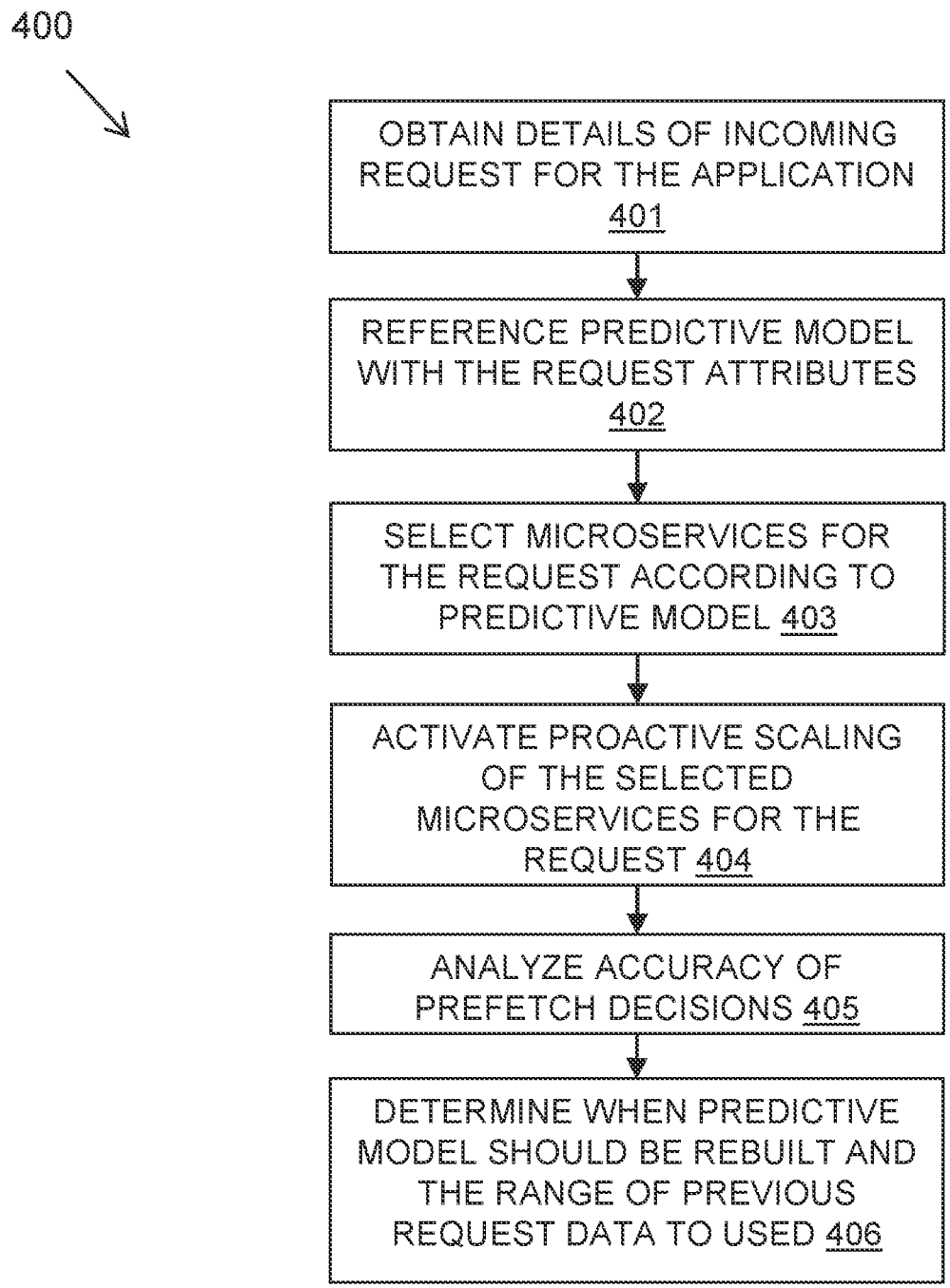
FIG. 4 depicts a flow diagram of an example embodiment of another aspect of a method in accordance with the present invention.

Referring to FIG. 4, a flow diagram 400 shows an aspect of the described method for proactive scaling microservices as carried out by a proactive scaling system 110.

The method obtains, in operation 401, details of an incoming request for an application by inspecting the new request arriving at the ingress by a scaling service. Requests may be made using REST over HTTP, or other forms of communication such as messaging.

The method may reference, in operation 402, the predictive model using the request attributes to find a relevant rule to obtain a list of microservices and their counts or probability weights.

The method may select, in operation 403, microservices to be proactively scaled up based on the list and the weightings. For example, a user may choose to scale only those microservices whose probability of involvement is higher than a defined threshold. The method may activate, in operation 404, the proactive scaling or prefetching of the selected microservices from the list.

The method may continually analyze, in operation 405, the accuracy of the proactive scaling predictions and may determine, in operation 406, when the predictive model should be rebuilt and the range of previous request data to be used. This analysis and rebuild may be carried out in cooperation with the predictive modeling system 130 as described in relation to the method of FIG. 3.

An example implementation for building the statistical model is described. Trace data for an initial microservice A is obtained. For each of the traces, a group number or identifier (for example, an operation name), request path, and the set of microservices that are involved are identified as shown in Table 1. The table shows a very small number of traces for the sake of illustration. In a real system, there may be 100s or 1000s of traces.

TABLE 1

| Operation Name | Request Path | Microservices involved |
| --- | --- | --- |
| View profile | /customers/dave | A, B, C |
| View profile | /customers/jo | A, B, C |
| Add customer | /customers/new/1234 | A, E |
| Add customer | /customers/new/5678 | A, F |
|  |  | (service F = failure path) |
| Dispatch vehicle | /dispatch | A, B |
|  | /dispatch | A, B |
|  | /dispatch | A, B |
|  | /dispatch | A, C |
|  |  | (service C = failure path) |
|  | /dispatch | A, B |

Below includes an example analysis process for building the statistical model and forming subgroups:

While there are traces that are not in a group, form a group containing all the traces with the most common parameter. The set of target microservices for a group is the union of microservices involved in the traces in that group.

For example, initially there are no groups, and a first group formed is a group containing the 5 traces with the path component "/dispatch," as it is the most common parameter. As there are still ungrouped traces, continue by forming a second group containing the 4 traces with the next most common parameter "/customers."

For each such group, while there is a microservice in the set of target microservices with a weight of less than 100%, split the group by adding the next most common parameter of those traces to the selection criteria. If heuristics determine that the resulting group is too specific, then move on to the next group. Continue the above step until either all microservices in the group are weighted 100%, or there are no more parameters to split on.

Store an entry in the aggregate table for each group that contains the set of request attributes, the set of microservices, and their weightings as shown in Table 2.

TABLE 2

| Rule | Request Attributes | Services (Weights if <100%) |
| --- | --- | --- |
| 1 | path("customers") | A, B, C |
| 2 | path("customers"), path("new") | A, E(50%), F(50%) |
| 3 | path("dispatch") | A, B(80%), C(20%) |

A key step in this algorithm is determining whether a group is too specific. This will result in rules that do not match on similar requests. Therefore, a heuristic approach is needed to determine whether a group is too specific. One such heuristic may be whether the proportion of requests in the group is less than a certain threshold value.

As the system does not understand the significance of the request attributes, it would be possible to create a group based on a very specific criterion. For example, a group of traces may be created for the request path "customers/jo." However, this would not be a useful predicter for future "view profile" requests for other users such as 'customers/fred.' As there will be proportionally few requests for "customers/jo," the heuristic can be used to identify this group as too specific, and just use "customers" instead.

An example implementation of how to apply the predictive model is to identify the attributes of the request (e.g. path elements, query parameters). Find the row in the aggregate table which matches the largest number of parameters in the request and scale up the corresponding set of microservices.

In cases where some microservices are not always involved (a weighting of <100%), the proactive scaling service may be configured to scale those services based on another heuristic, including for example: a simple threshold—for example, scale services if they are involved >70% of the time; or a latency requirement—for example, use knowledge of the startup time of each service to scale up slower-starting services just in case, in order to keep the worst-case request duration within a certain limit.

In an example, a car dispatch request may involve services A, B, and C, which has been recorded 100 times. The data shows that service A is always needed, service B is commonly needed as it is involved in 80% of requests, however, service C is only involved in 20% of cases. In this case, there is no other parameter that can be used to distinguish between requests that require service B and those that require service C. Using the threshold heuristic, the proactive scaling service would scale up services A and B.

If instead, another parameter was available such as "number of persons>8?"=(true/false), that distinguishes that service B is required when the number of persons is greater than 8 and service C is required when the number of persons is less than 8. This would result in two rules with a 100% weighting as follows:

"/dispatch"→"is number of persons>8?," if "False" the proactive scaling service would scale up services A and B, if "True" the proactive scaling service would scale up services A and C.

Figure 5:
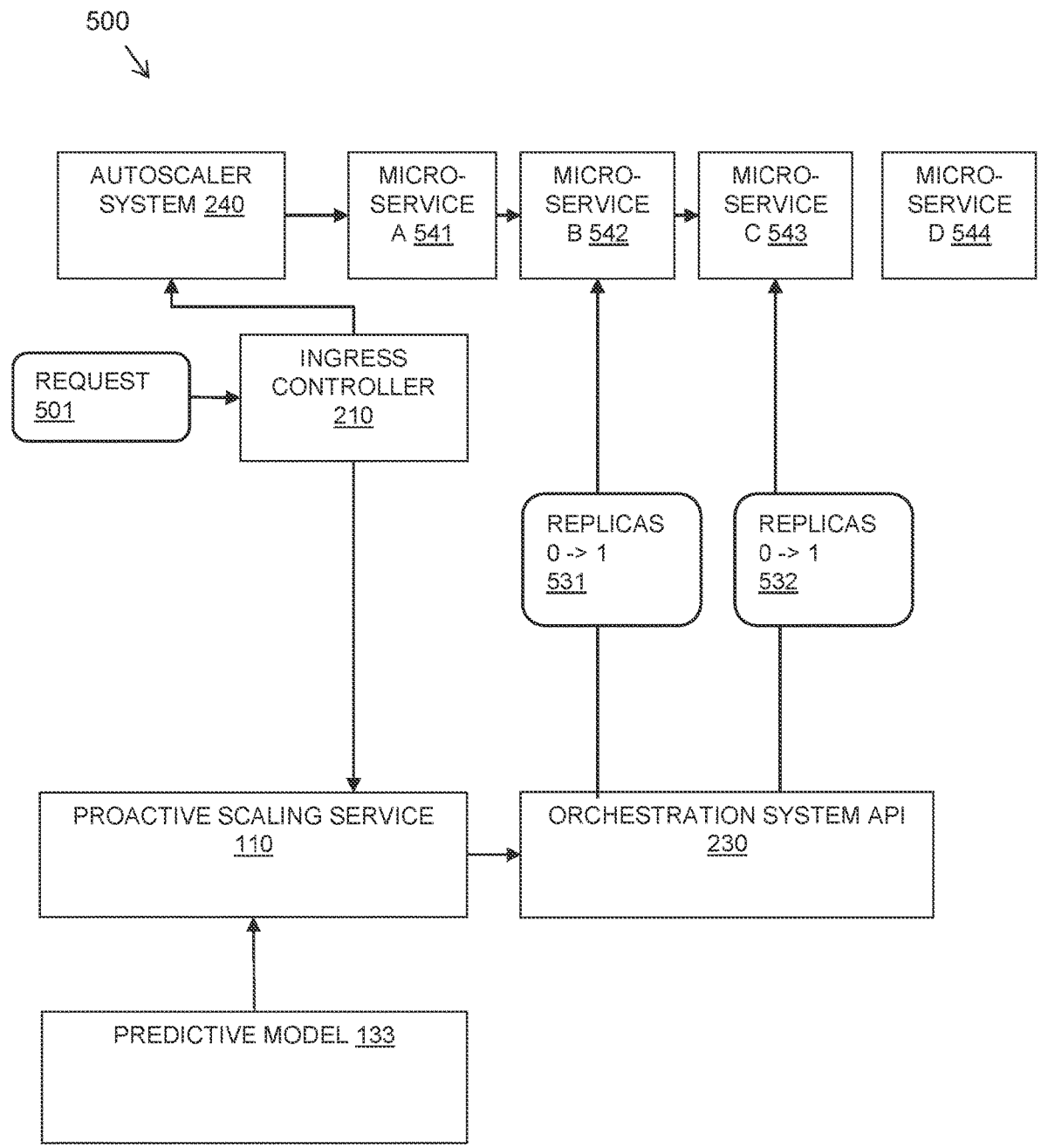
FIG. 5 depicts a schematic diagram of an example embodiment of an implementation in accordance with the present invention.

Referring to FIG. 5, an example implementation 500 is described using HTTP based scaling using an ingress controller 210. A conventional ingress controller 210 is capable of analyzing attributes of an HTTP request and using this information to determine which initial microservice should receive that request. The implementation 500 includes a proactive scaling system 110 that leverages analysis of an HTTP request (for example, the method, path, query parameters, and headers) to select and scale a number of microservices based on the described predictive model.

When a request 501 arrives at an ingress controller 210, the request is analyzed to determine which microservice 541 it should be delivered to and to route the request 501 to an existing autoscaler system 240 for microservice A 541 as part of its normal function. Additionally, the ingress controller 210 routes details of the request to a proactive scaling system 110 that provides a proactive scaling service.

The proactive scaling system 110 may be implemented as one of the following options. The proactive scaling system 110 may be implemented as an embedded component, such as an ingress controller plugin, that performs the proactive activation service in addition to the normal function of the ingress controller 210 of routing requests to the intended endpoint. As another option, the proactive scaling system 110 may be implemented as a separate component called by the ingress controller 210 in addition to its normal routing function. As a further option, the proactive scaling system 110 may be a separate component that acts as a forwarding proxy. In this case, the ingress controller 210 may route all traffic to the proactive scaling system 110, and the proactive scaling system 110 would both forward the request to the intended endpoint and perform the proactive activation service.

The proactive scaling system 110 queries the predictive model 133 by providing attributes of the request and obtains a list of microservices to scale. The method may select and scale the selected microservice if it is currently scaled to zero. The proactive scaling system 110 may query the orchestrator system API 230 to obtain the desired replica counts for the deployments and may use the orchestration system API 230 to set the replica count for the selected microservices.

The deployments may be determined to be microservice A 541, microservice B 542, and microservice C 543, with microservice D 544 not being involved in this request.

The proactive scaling system 110 sets the desired replica count to 1 531, 532 for any deployment whose count was currently 0. One such method is directly modifying the replica count of each deployment via the orchestration system API 230.

In this example, microservice B 342 and microservice C 343 are scaled to 1 531, 532. Microservice A 341 has already been scaled to 1 via the existing autoscaler system 240 handling the initial microservice for the request 501. Microservice A 541 processes the request and makes a request to microservice B 542, which is already scaled up and can handle the request immediately. Microservice B 542 processes the request and makes a request to microservice C 543, which is already scaled up.

Figure 6:
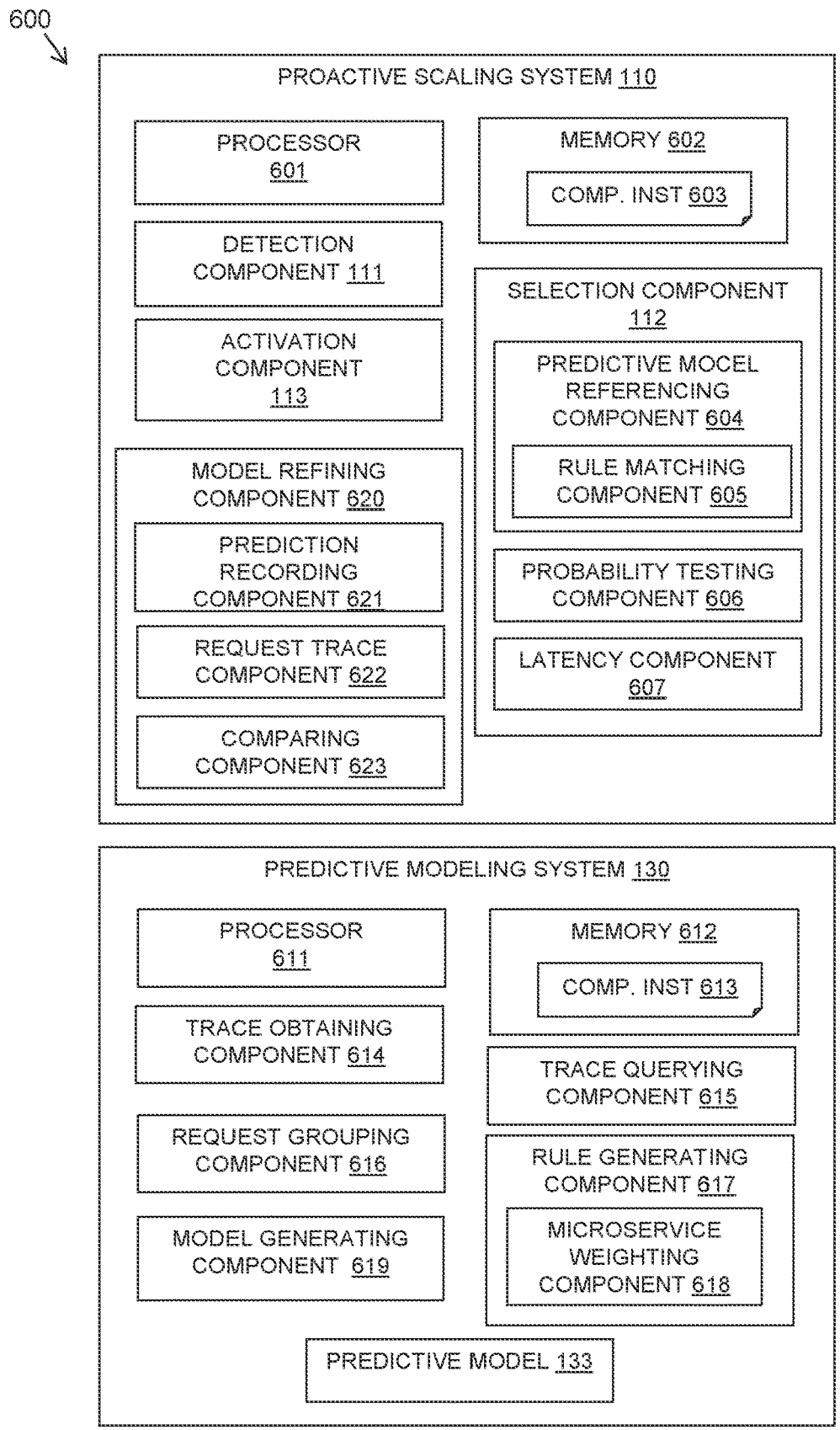
FIG. 6 depicts a block diagram of an example embodiment of a system in accordance with the present invention.

Referring to FIG. 6, a block diagram 600 shows a proactive scaling system 110 and a predictive modelling system 130. Each of the proactive scaling system 110 and predictive modeling system 130 may be provided on one or more computing systems including at least one processor 601, 611, a hardware module, or a circuit for executing the functions of the described components which may be software units executing on the at least one processor. Multiple processors running parallel processing threads may be provided enabling parallel processing of some or all of the functions of the components. Memory 602, 612 may be configured to provide computer instructions 603, 613 to the at least one processor 601, 611 to carry out the functionality of the described components that may be provided as software components.

The predictive modeling system 130 may include a trace obtaining component 614 for obtaining tracing data of microservices of an application for historical requests processed by the application. The predictive modeling system 130 may include a trace querying component 615 for querying the obtained tracing data for an initial microservice. The predictive modeling system 130 may include a request grouping component 616 for grouping the tracing data based on common request attributes. In one embodiment, grouping the tracing data based on common request attributes groups the tracing data for an initial microservice.

The predictive modeling system 130 may include a rule generating component 617 for aggregating each group into a rule relating the common request attributes to lists of microservices. The rule generating component 617 may include a microservice weighting component 618 for providing a probability of a microservice being required.

The predictive modeling system 130 may include a model generating component 619 for building a predictive model 133 formed of the rules for processing incoming requests to obtain a list of predicted microservices required for the incoming request based on attributes of the incoming request.

The proactive scaling system 110 may include a detection component 111 for detecting an incoming request to an application in a serverless microservice environment, where the incoming request results in a chain of invocations of microservices of the application.

The proactive scaling system 110 may include a selection component 112 for selecting microservices of the application required for performing a task of the incoming request including a predictive model referencing component 604 for referencing the predictive model with attributes of the request to determine the predicted microservices. The predictive model referencing component 604 may include a rule matching component 605 for searching for a rule by matching the largest number of attributes of the request.

The selection component 112 may include a probability testing component 606, where if a rule includes a microservice having a probability of being required of less than 100%, the probability testing component 606 applies a configured probability threshold.

The selection component 112 includes a latency component 607, where if a rule includes a microservice having a probability of being required of less than 100%, the latency component 607 applies a known latency of the microservice.

The proactive scaling system 110 may include an activation component 113 for triggering activating scaling up the selected microservices.

The proactive scaling system 110 or the predictive modeling system 130 may include a model refining component 620 including a prediction recording component 621 for recording a prediction of microservices for an incoming request; a request trace component 622 for obtaining tracing data of the microservices of the application used for processing the request; and a comparing component 623 for comparing the prediction with the tracing data for refining the predictive model.

The components of the proactive scaling system 110 shown in FIG. 1 may be implemented by various different options described below. References to incoming requests may also refer to incoming events in event-based systems.

The Request Detection Component

The detection component 111 for detecting incoming network requests may be implemented by the following example options.

1. Existing autoscaler systems scale a single microservice deployment from zero in response to a request. This may be modified to detect an incoming request to scale selected microservices of the application.

2. An operator, running independently in an orchestration system, may be programmed to monitor the replica count of an initial microservice that is scaled up (via existing technology) in response to an incoming request. When that replica count increases from zero, the selection stage may be activated.

3. An ingress controller responsible for routing incoming requests to their respective endpoints (microservices) already knows which microservice to route a request to, and can be modified to activate the selection stage.

The Microservice Selection Component

The microservices selection component 112 for selecting microservices that are required for the fulfillment of the incoming request may be implemented using the following options.

In this method, the selection of the microservices is governed by the predictive model. If an incoming request matches a rule, then the rule determines which services are selected. If an incoming request does not match any existing rule, then no proactive scaling action is taken—over time, additional rules may be created by the refinement process.

The Microservice Activation Component

The microservice activation component 113 for activation of microservices that are required for the fulfillment of the incoming request may be implemented using the following options.

1. The microservices may be scaled up by using the orchestration system API to increase the replica count of subsequent microservices to 1.

2. An HTTP request may be sent to a known endpoint provided by each of the subsequent microservices. This triggers an existing scaling controller to scale up the microservices to 1. This request will not cause the microservice to do actual work, but simply trigger it to scale. Therefore, a request to a health check endpoint (such as "/health") may be used.

3. A wake-up message may be sent to a dedicated event source, such as an event service topic.

The implementation options of each of the stages may be used in more than one embodiment.

Figure 7:
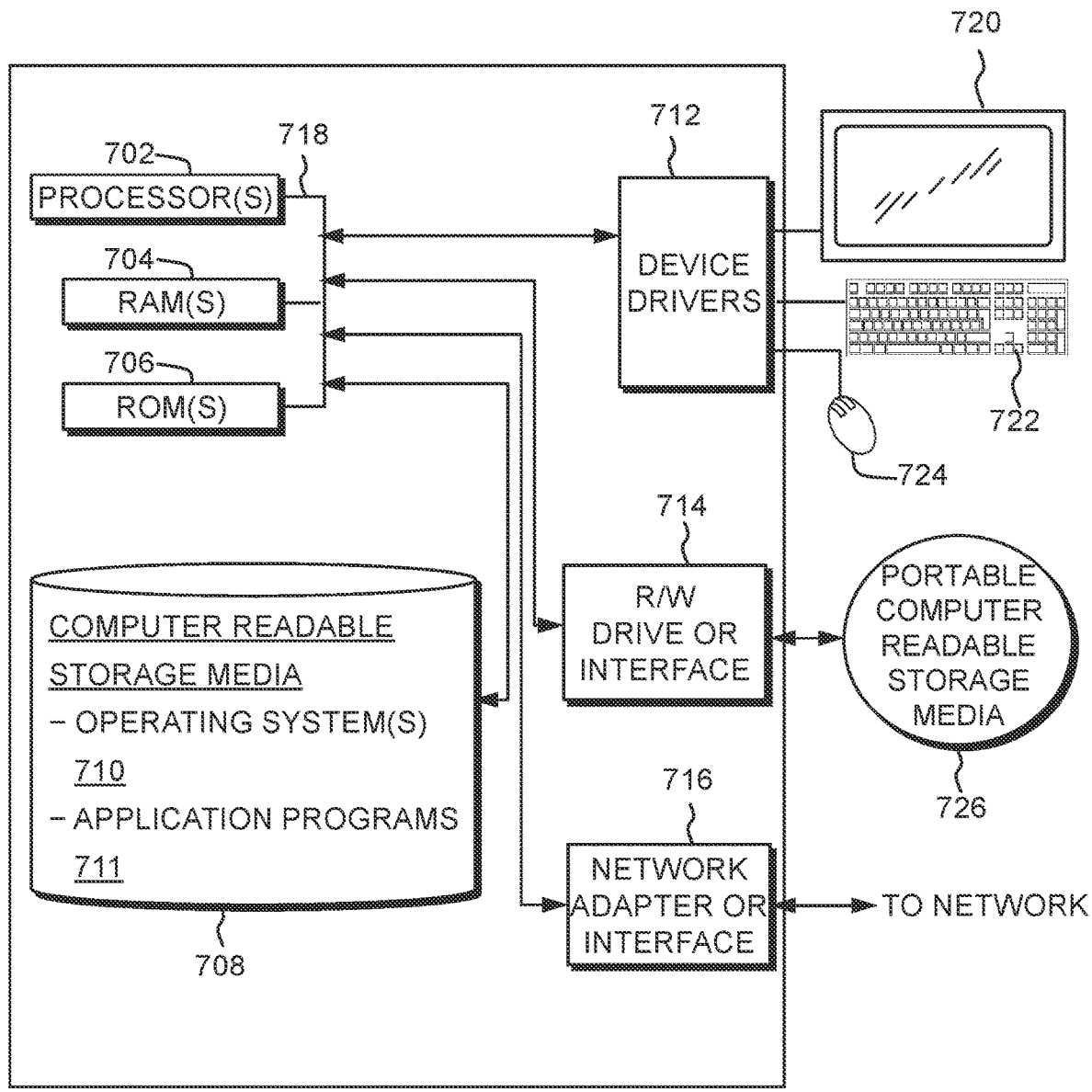
FIG. 7 depicts a block diagram of an embodiment of a computer system or cloud server in which the present invention may be implemented.

FIG. 7 depicts a block diagram of components of a computing system as used for the computing system, in accordance with an embodiment of the present invention. It should be appreciated that FIG. 7 provides only an illustration of one implementation and does not imply any limitations with regard to the environments in which different embodiments may be implemented. Many modifications to the depicted environment may be made.

The computing system can include one or more processors 702, one or more computer-readable RAMs 704, one or more computer-readable ROMs 706, one or more computer readable storage media 708, device drivers 712, read/write drive or interface 714, and network adapter or interface 716, all interconnected over a communications fabric 718. Communications fabric 718 can be implemented with any architecture designed for passing data and/or control information between processors (such as microprocessors, communications and network processors, etc.), system memory, peripheral devices, and any other hardware components within the system.

One or more operating systems 710, and application programs 711, such as the microservice activation system 320 are stored on one or more of the computer readable storage media 708 for execution by one or more of the processors 702 via one or more of the respective RAMs 704 (which typically include cache memory). In the illustrated embodiment, each of the computer readable storage media 708 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

The computing system can also include a R/W drive or interface 714 to read from and write to one or more portable computer readable storage media 726. Application programs 711 on the computing system can be stored on one or more of the portable computer readable storage media 726, read via the respective R/W drive or interface 714 and loaded into the respective computer readable storage media 708.

The computing system can also include a network adapter or interface 716, such as a TCP/IP adapter card or wireless communication adapter. Application programs 711 on the computing system can be downloaded to the computing device from an external computer or external storage device via a network (for example, the Internet, a local area network or other wide area networks or wireless networks) and network adapter or interface 716. From the network adapter or interface 716, the programs may be loaded into the computer readable storage media 708. The network may comprise copper wires, optical fibers, wireless transmission, routers, firewalls, switches, gateway computers and edge servers.

The computing system can also include a display screen 720, a keyboard or keypad 722, and a computer mouse or touchpad 724. Device drivers 712 interface to display screen 720 for imaging, to keyboard or keypad 722, to computer mouse or touchpad 724, and/or to display screen 720 for pressure sensing of alphanumeric character entry and user selections. The device drivers 712, R/W drive or interface 714, and network adapter or interface 716 can comprise hardware and software stored in computer readable storage media 708 and/or ROM 706.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
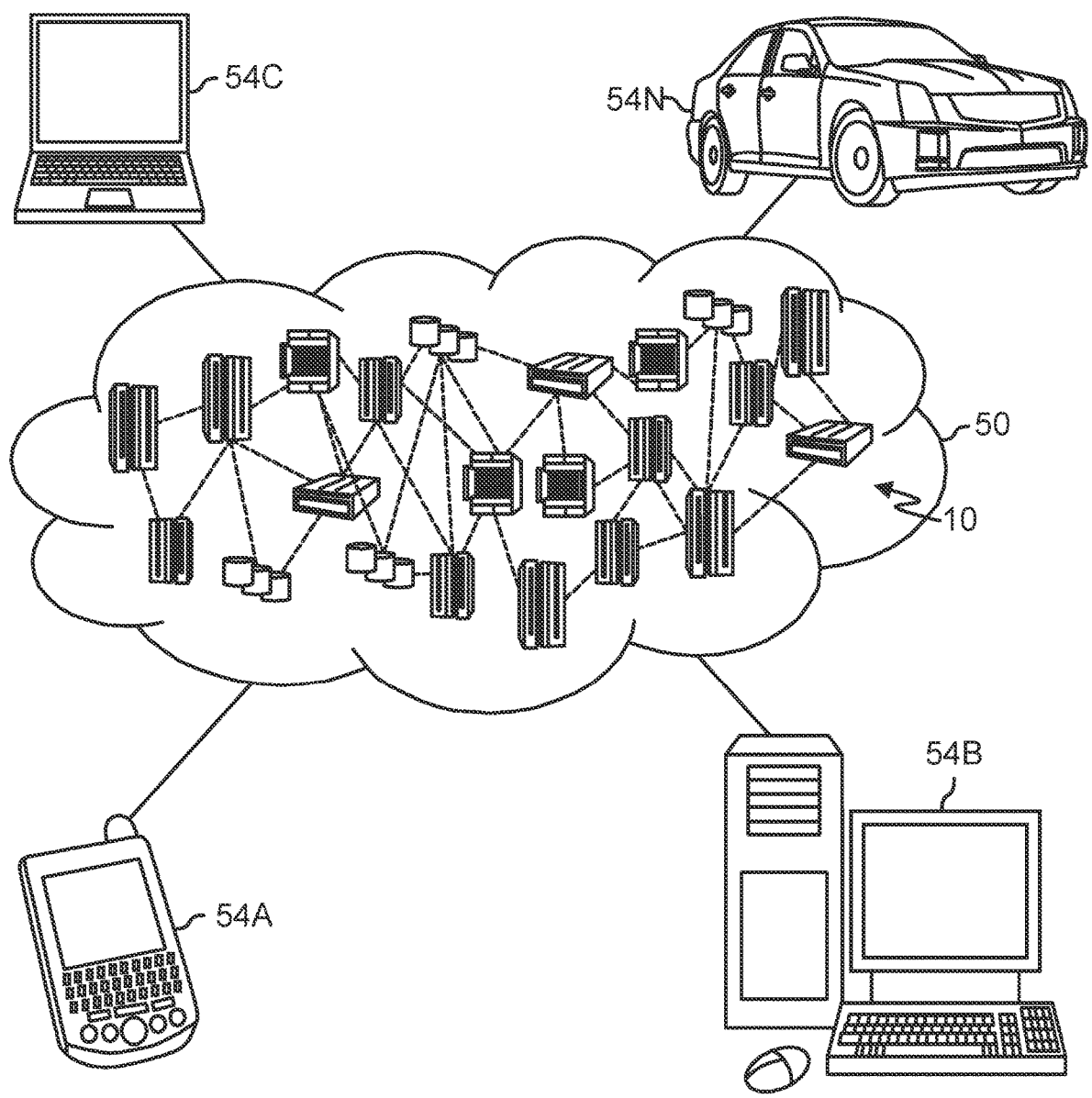
FIG. 8 depicts a schematic diagram of a cloud computing environment in which the present invention may be implemented.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
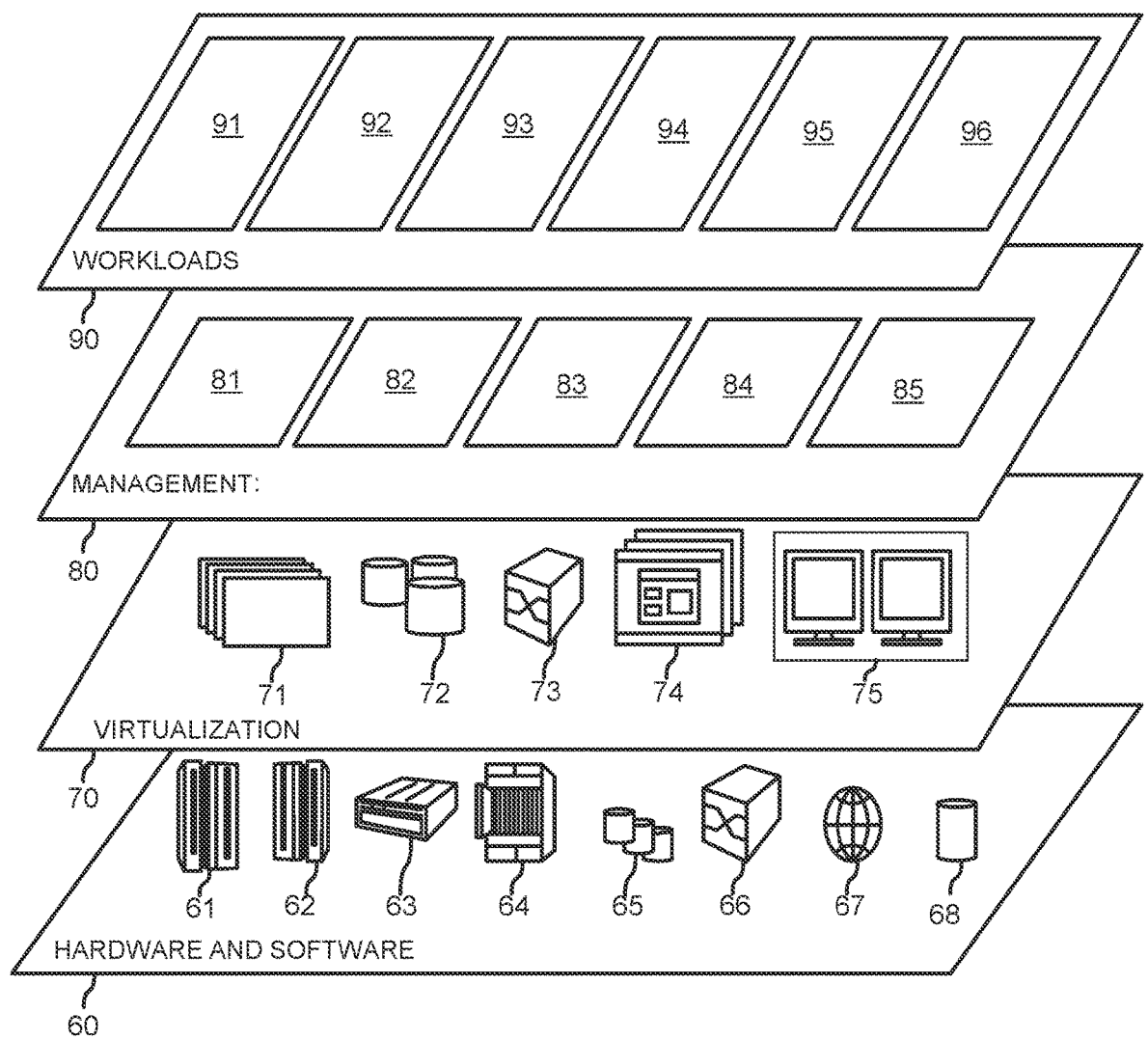
FIG. 9 depicts a diagram of abstraction model layers of a cloud computing environment in which the present invention may be implemented.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and microservice activation processing 96.

A computer program product of the present invention comprises one or more computer readable hardware storage devices having computer readable program code stored therein, said program code executable by one or more processors to implement the methods of the present invention.

A computer system of the present invention comprises one or more processors, one or more memories, and one or more computer readable hardware storage devices, said one or more hardware storage device containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for predicting microservices required for incoming requests, comprising:
    obtaining tracing data of microservices of an application for historical requests processed by the application;
    grouping the tracing data based on common request attributes;
    aggregating each group into rules relating the common request attributes to lists of microservices; and
    building a predictive model formed of the rules for processing incoming requests to obtain a list of predicted microservices required for the incoming request based on attributes of the incoming request.

2. The method of claim 1, further comprising:
    querying the obtained tracing data for an initial microservice, wherein grouping the tracing data based on common request attributes groups the tracing data for an initial microservice.

3. The method of claim 1, wherein aggregating each group into a rule relating the common request attributes to lists of microservices includes a probability of a microservice being required.

4. The method of claim 3, wherein aggregating each group into a rule includes splitting groups by adding an additional common attribute as selection criteria when there is a microservice with a probability below a threshold.

5. The method of claim 1, further comprising:
    determining if a group is too specific based on a defined heuristic such that rules do not match on similar requests, wherein the heuristic determines if a proportion of requests in the group is less than a threshold value.

6. The method of claim 1, further comprising:
   detecting an incoming request to an application in a serverless microservice environment, wherein the incoming request results in a chain of invocations of microservices of the application;
   selecting microservices of the application required for performing a task of the incoming request by referencing the predictive model with attributes of the request to determine the predicted microservices; and
   triggering activating scaling up the selected microservices.

7. The method of claim 6, wherein referencing the predictive model searches for a rule matching a largest number of attributes of the request.

8. The method of claim 7, further comprising:
   when a rule includes a microservice having a probability of being required of less than 100%, selecting the predicted microservice when the probability is above a configured threshold or based on a known latency of the microservice.

9. The method of claim 1, further comprising:
   recording a prediction of microservices for an incoming request;
   obtaining tracing data of the microservices of the application used for processing the request; and
   comparing the prediction with the tracing data for refining the predictive model.

10. The method of claim 9, wherein comparing the prediction with the tracing data includes:
    determining a success rate of each rule in the predictive model by comparing the prediction for each request with the recorded outcome and using the success rate to refine the predictive model.

11. The method of claim 10, wherein using the success rate to refine the predictive model includes at least one of:
    if the success rate of a rule falls below a given threshold, refine by updating weights for each service in the rule using newly collected trace data;
    if the success rate of a particular rule can be improved by splitting it into more specific rules based on additional parameters, refine the rule by splitting;
    if the overall success rate of the predictive model falls below a given threshold, refine by rebuilding the predictive model; and
    if the success rate determines that the predictive model has become less successful over time, refine the range of trace data to use when rebuilding to include more recent traces.

12. A system for predicting microservices required for incoming requests, including a processor and a memory configured to provide computer program instructions to the processor to execute the function of the following components, the system comprising a predictive modeling system configured to:
    obtain tracing data of microservices of an application for historical requests processed by the application;
    group the tracing data based on common request attributes;
    aggregate each group into rules relating the common request attributes to lists of microservices; and
    build a predictive model formed of the rules for processing incoming requests to obtain a list of predicted microservices required for the incoming request based on attributes of the incoming request.

13. The system of claim 12, further configured to:
    query the obtained tracing data for an initial microservice, wherein grouping the tracing data based on common request attributes groups the tracing data for an initial microservice.

14. The system of claim 12, wherein aggregating each group into a rule relating the common request attributes to lists of microservices includes a probability of a microservice being required.

15. The system of claim 12, further configured to:
    detect an incoming request to an application in a serverless microservice environment, wherein the incoming request results in a chain of invocations of microservices of the application;
    select microservices of the application required for performing a task of the incoming request by referencing the predictive model with attributes of the request to determine the predicted microservices; and
    trigger activating scaling up the selected microservices.

16. The system of claim 15, wherein referencing the predictive model searches for a rule matching a largest number of attributes of the request.

17. The system of claim 15, further comprising:
    when a rule includes a microservice having a probability of being required of less than 100%, selecting the predicted microservice when the probability is above a configured threshold or based on a known latency of the microservice.

18. The system of claim 12, further configured to:
    record a prediction of microservices for an incoming request;
    obtain tracing data of the microservices of the application used for processing the request; and
    compare the prediction with the tracing data for refining the predictive model.

19. The system of claim 18, wherein comparing the prediction with the tracing data includes:
    determining a success rate of each rule in the predictive model by comparing the prediction for each request with the recorded outcome and using the success rate to refine the predictive model.

20. A computer program product for predicting microservices required for incoming requests, the computer program product comprising a computer readable storage medium having program instructions embodied therewith, the program instructions executable by a processor to cause the processor to:
    obtain tracing data of microservices of an application for historical requests processed by the application;
    group the tracing data based on common request attributes;
    aggregate each group into rules relating the common request attributes to lists of microservices; and
    build a predictive model formed of the rules for processing incoming requests to obtain a list of predicted microservices required for the incoming request based on attributes of the incoming request.

* * * * *